(12) United States Patent
Spijker et al.

(10) Patent No.: US 6,412,617 B1
(45) Date of Patent: Jul. 2, 2002

(54) CONTINUOUSLY VARIABLE TRANSMISSION HAVING A CONTINUOUSLY SLIPPING CLUTCH

(75) Inventors: Engbert Spijker, Helmond; Peter Bäuerle, Tilburg, both of (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/611,224

(22) Filed: Jul. 6, 2000

(30) Foreign Application Priority Data

Jul. 6, 1999 (EP) .............................. 99202190

(51) Int. Cl.[7] .............................. B60K 41/22
(52) U.S. Cl. ................. 192/3.55; 192/103 F; 474/8
(58) Field of Search .............. 192/3.54, 3.55, 192/3.58, 103 F; 474/8; 477/39, 44, 176

(56) References Cited

U.S. PATENT DOCUMENTS 4,433,594 A * 2/1984 Smirl ........................ 475/206
5,006,092 A * 4/1991 Neuman et al. ................ 474/8
5,314,385 A * 5/1994 Haley et al. ................... 474/28
5,672,132 A 9/1997 Schwab

FOREIGN PATENT DOCUMENTS

| EP | 03121322 | 5/1991 |
| EP | 0 466 497 A1 | 9/1991 |
| EP | 0 458 450 A1 | 11/1991 |

* cited by examiner

Primary Examiner—Richard M. Lorence
(74) Attorney, Agent, or Firm—Young & Thompson

(57) ABSTRACT

A continuously variable transmission (1) is provided with: an endless transmission (14) for transmitting a driving torque; a clamping force (13-1, 13-2) coupled with the endless transmission (14) for applying a clamping force thereon; a controller (15) coupled with the clamping force (13) for influencing the driving torque by controlling the clamping force applied on the endless transmission (14); and a clutch (16) coupled with the controller (15), whereby the controller (15) is arranged to control the clutch such that the clutch (16) is allowed to slip continuously. The net effect of a practical implementation of the transmission in a vehicle is a fuel saving which, if a slip of around 5 rpm is permitted, amounts about 3–4%.

18 Claims, 1 Drawing Sheet

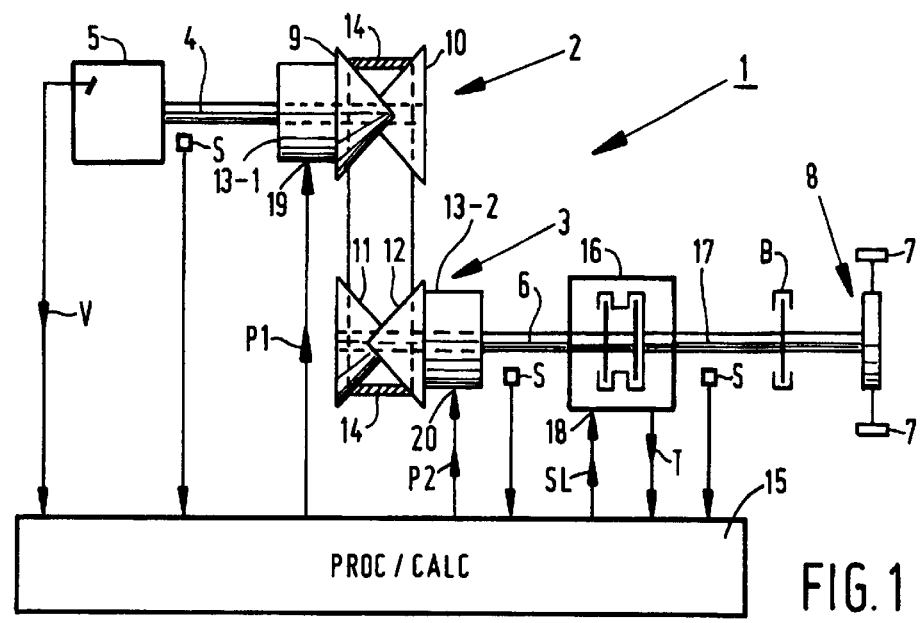
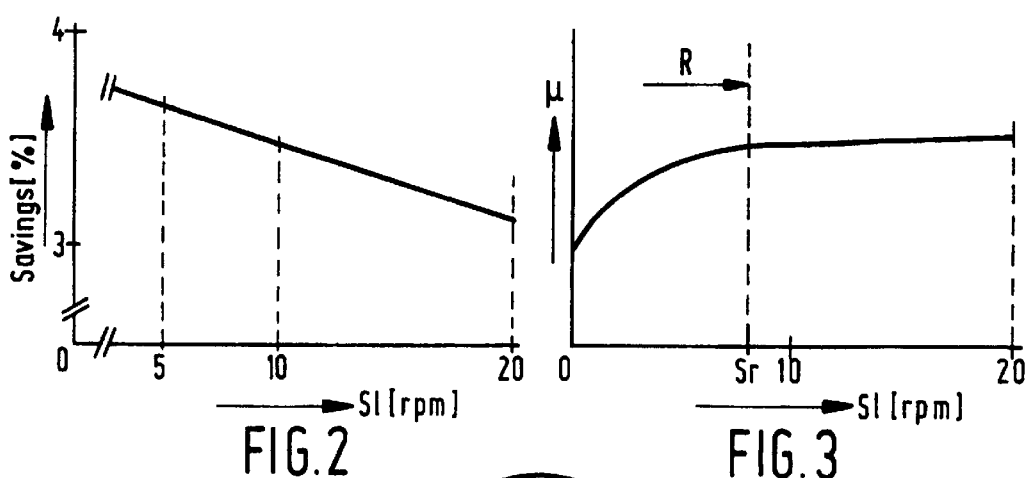
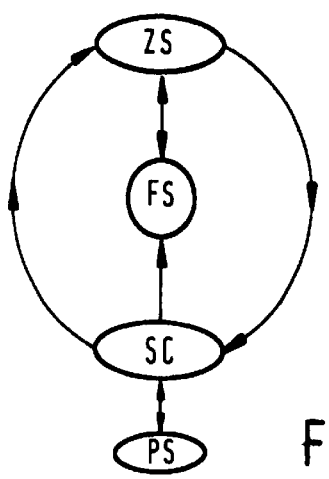

CONTINUOUSLY VARIABLE TRANSMISSION HAVING A CONTINUOUSLY SLIPPING CLUTCH

BACKGROUND OF THE INVENTION

The present invention relates to a continuously variable transmission provided with:
- a driving shaft connectable to an engine;
- a driven shaft connectable to a load;
- transmission means for transmitting a driving power between said shafts;
- a clutch associated with at least one of said shafts and having an in-going shaft and an out-going shaft; and
- control means at least capable of controlling said clutch.

The present invention also relates to a clutch suited for use in a continuously variable transmission.

In U.S. Pat. No. 4,606,446 a continuously variable transmission is described. In the known transmission a torque transmitting belt is clamped between the conical discs of two pulleys. The force with which the belt is clamped is controlled to transmit torque between said pulleys without slip of the belt between said discs occurring. Such slip is highly undesirable, because it leads to excessive wear of the belt and could considerably reduce the working life of the transmission. The transmission is provided with a magnetic particle clutch, which is electrically controlled to slip at a clutch slip torque lower than the belt slip torque at which the belt commences to slip. Based on measurement of variables, such as rotation speed of the engine, rotation speed of in-going and out-going clutch shafts, engine throttle opening, vehicle speed, et cetera, a clutch slip torque is calculated to be a slightly higher than a calculated developed engine torque. The belt slip torque is controlled to be a slightly higher than the clutch slip torque. In this manner it is achieved, that actual transmitted torques exceeding the clutch slip torque advantageously lead to a temporary slip of the magnetic particle clutch instead of leading to slip of the torque transmitting belt between the discs of a pulley. The actual transmitted torques may exceed the calculated engine torque due to unknown or unforeseen influences, such as torque jumps emanating from the driven shaft or inaccuracy of the calculated engine torque.

A continuously variable transmission is known from EP-A-0 446 497, which discloses a hydraulically controllable clutch as a belt slip preventing means. The transmission is constructed such that the clutch will slip at a lower torque than the belt, thereby preventing excessive belt wear. This is achieved by controlling the clutch slip torque—which is the torque at which the clutch shows a tendency to slip—to be slightly higher than the developed engine torque, but slightly lower than the belt slip torque. Although in principle the transmission should function satisfactory, in practice it has proven to be very difficult to control the clutch slip torque such that it is at all times only slightly higher than the developed engine torque. This is due to fact that the clutch slip torque is dependent on several parameters, such as temperature and rotational speeds, and furthermore may vary over a prolonged period of use. The result of which is, that either the clutch slip torque can become higher than the belt slip torque, possibly leading to belt slip, or that the efficiency of the transmission is reduced, due to the need for a higher force for clamping the belt. In EP-A-0.446.497 it is also recognised that in case a bridging clutch of a lock-up means of a torque converter is integrated in the slip preventing means, such lockup is arranged for being controlled in a pulsating way, that is either fully closed or open, i.e. either bridging the torque converter or not. This provides for a controlled continuous slip, which however pulsates. This type of pulsating control is undesirable since it leads to excess vibrations of the transmission and vehicle which influences driving comfort in a negative way and in addition leads to a poor transmission efficiency. Furthermore, the known lock-up means are not designed for such kind of operation and would yield a shortened working life.

A general disadvantage of the known solutions is, that during normal operation the means adapted for preventing belt slip have a positive torque capacity, i.e. the clutch slip torque is slightly higher than the developed engine torque. This means that, when a torque jump exceeding said clutch slip torque arrives at the transmission, the torque transferred by belt suddenly rises from the developed engine torque to the clutch slip torque. Due to inertia effects this sudden rise of transferred torque might still lead to undesired belt slip.

SUMMARY OF THE INVENTION

It is an object of the present invention to provide a continuously variable transmission wherein transmission belt slip is prevented in a robust and optimal manner, preferably with an improved efficiency, and to provide a motor vehicle incorporating such a continuously variable transmission, which possesses a decreased fuel consumption and an increased driving comfort.

Thereto the continuously variable transmission according to the present invention is characterised in that the control means are arranged to control a marginal though notional amount of essentially continuous clutch slip, such that the driving power is virtually but not entirely transmitted through the clutch during operation of the transmission for protecting the transmission against torque jumps emanating from either one of the engine and the load.

By this measure the invention vis-à-vis the state of the art overcomes the technical prejudice, that the most efficient means for preventing belt slip will be a clutch arranged and controlled such that the clutch slip torque is slightly higher than the driving torque. The present invention also overcomes the psychological prejudices that continuous slip over a clutch would lead to unacceptably poor efficiency, burned clutch plates and/or wear.

The transmission according to the invention has the advantage, that when a torque jump arrives at the transmission the clutch is already slipping. Due to the torque jerk it will slip even more, but there will thus be no threshold value of torque to be overcome by the belt clamping force before the clutch starts its protecting slipping action. In other words there will be no noticeable rise in torque transferred by the clutch and therefore by the belt, yielding an efficient protection against belt slip. According to the invention the belt slip torque may be chosen essentially equal to the developed engine torque, yielding an efficient transmission.

It is an advantage of the continuously variable transmission according to the present invention that the clutch can advantageously be used to smoothly protect the continuously variable transmission against abrupt torque jumps emanating from either a vehicle engine and/or the load, such as the wheels of a vehicle. This in addition to protecting the friction type transmission from slipping improves the driving comfort of a vehicle having the present transmission.

As a rule the clutch will already be slipping continuously before it will slip even more if said jumps arise. So the clutch will not have to be pulled loose if said torque jumps arise, which promotes a smooth and elegant accommodation of torque jumps even further.

The inventor found out further that the amount of energy, which is necessary to have the transmission means transmit a required driving torque can be reduced if some continuous, generally a marginal though notional amount of slip, is allowed to occur in the clutch, in particular by allowing the clamping or pinching force applied on a transmission means, such as a belt in the transmission means to decrease for example during transmission periods—being relatively long periods of smooth varying torque transmission, such as during normal operation or driving—the fuel consumption can be reduced noticeably. This is due to the fact that the increase of fuel loss because of some generally small allowed slip in the clutch surprisingly appears to be more than offset by a generally simultaneous decrease of required clamping force. So a net positive reduction of fuel consumption arises during a load process, such as in a vehicle incorporating the present transmission.

In addition, because of the average lower energy, e.g. clamping force required for the transmission of torque such as during said periods, these corresponding clamping force means, as well as the endless transmission belt or means could be made less robust or heavy, without jeopardising the proper and reliable operation of the transmission according to the invention.

Furthermore power or energy loss and wear in the endless transmission belt and clamping force means are reduced because of the lowered clamping force, which adds to prolonging the working lifetime of the transmission as a whole. In addition the lowered clamping force reduces internal tension in the transmission belt and obviates the undesired occurrence of slip of the belt or means.

A still further advantage of the transmission of the invention is that the advantages accompanying the reduced clamping force hold irrespective the type of continuously variable transmission that is being used. If a mechanical, i.e. friction type of continuously variable transmission, such as a hydraulically controlled clamping force means is used the mentioned line pressure can be reduced. In other types of mechanical transmissions such as chain or toroidal transmissions the mechanically applied clamping force to vary the transmission ratio can be reduced as well, whereas in electrically, electromechanically or electromagnetically controlled clamping force means the effective currents or electric power necessary to clamp the transmission means, including the transmission discs and belt can be reduced considerably. This even reduces the power consumption of a variety of types of continuously variable transmissions according to the invention.

An additional advantage of the transmission according to the invention is that vibrations and noise, such as emanating from the road or from the engine, which are conveyed to the interior of the vehicle, can be reduced, as the present slipping clutch contributes to make noise and vibrations in the vehicle less disturbing, leading to an increase of comfort when the transmission of the invention is being applied in a vehicle.

Moreover another advantage arises because a generally accepted fixed safety margin above a maximally required clamping force for transmitting a nominal torque can now be diminished, such that this safety margin is made variable and dependent on the actual required torque.

In a particular embodiment of the transmission according to the invention the control means are arranged to maintain a substantially constant continuous slip, in order to optimise fuel savings. It appeared in practise that such a substantially constant slip settles an adequate protection against torque jerks, such as originating from the road.

It is noted that the torque fuse feature as the invention is alternatively denoted, need not necessarily be applied in all circumstances. It may e.g. be applied favourably in another embodiment of the invention in those parts or areas of the speed range of a vehicle wherein the transmission is to be applied, wherein safety of the belt is most critical or where fuel saving is greatest. Preferably however the said clutch slip will be applied throughout the entire speed range and will only be switched off when due to a concentration of torque jumps it is detected that the clutch may become overheated, or should be cooled somewhat for the same reason.

A further embodiment of the transmission according to the invention has the characterising feature that the clutch is associated with the driven shaft. This downstream position of the clutch is favoured because possible torque jumps originating from the road or the wheels of the vehicle will not reach the transmission means, that is the variator part thereof. This part for example includes the transmission discs and transmission belt, which elements are most safely protected by the continuously slipping clutch in such a configuration, in particular at high vehicle speeds, where the torque jumps emanating from the road are relatively heavy and disturbing.

A still further embodiment of the transmission according to the invention characterised in that the control means is provided with calculating means whereto signals are input, which signals represent in-going and out-going rotation shaft speeds of the clutch, and which calculating means are coupled with a slip control input of the clutch for defining an amount of the allowed slip for controlling the clamping force-provides the advantage that an accurate control of the interrelation between the amounts of possibly reduced clamping force and allowed slip is achieved by generally micro-processor controlled calculations of the various signals that are practically available, such as mentioned in the prior art U.S. Pat No. 4,606,446 above. Advantageously no relatively vulnerable and costly pressure sensors are needed for the measurements and calculations in this embodiment.

Preferably in a still further embodiment the slip is tuned in a clutch shafts speed difference range between 0 and approximately 20 rpm, preferably between 0 and 10 rpm, more preferably around 5 rpm. In the lower slip range fuel savings are less and control of the amount of slip becomes insecure and creates the risk that the clutch will jump to a closed position uncontrolled. A higher slip, in particular around 5 rpm, which can be detected easily, will allow a more substantial reduction to save fuel. However a slip which is too high will lead to substantial wear of the clutch and to an increased waste of energy in the clutch, which may even not be offset by a fuel saving due to a lowered clamping force. If necessary the slipping clutch could be cooled for example by allowing the heat of the clutch to be used, such as for the heating in a vehicle. A preferred slip of around 5 rpm typically provides a net fuel saving of about 3 to 4%.

In addition the inventor found that a friction clutch material showing a friction coefficient behaviour, such that in the low speed difference range its friction coefficient increases with increasing slip is preferred. From the slip control point of view it appeared in practise that if such clutch material has the feature that the friction coefficient increases with increasing slip a very stable control of the slipping process in the continuously variable transmission according to the invention is easily achievable with the aid of standard electronics. Such feature should at least be present in the above mentioned tuning ranges of the clutch, i.e. at the lowest slip range.

A further embodiment of the of the clutch according to the present invention is characterised in that in the higher speed difference range the friction coefficient is substantially constant. This ensures that even during road induced disturbances a constant torque is transmitted through the clutch and that the amount of slip will still be controllable, while the transition to a higher slip value—i.e. the occurrence of a torque jump—may be easily detected. Also the power to keep the clutch closed when desired is easily determinable.

BRIEF DESCRIPTION OF THE DRAWINGS

At present the continuously variable transmission and related subjects according to the invention will be elucidated further together with their additional advantages while reference is being made to the appended drawing. In the drawing:

FIG. 1 shows a schematic diagram of a possible embodiment of the continuously variable transmission according to the present invention;

FIG. 2 shows a graph elucidating the course of the achievable fuel saving percentage due to a reduced clamping force against an increasing slip of the clutch in the transmission of FIG. 1;

FIG. 3 shows a graph elucidating the course of the friction coefficient of a friction material against the absolute slip value, which material can be applied in a clutch according to the present invention in the transmission of FIG. 1; and FIG. 4 shows a state diagram for elucidating a possible strategy for controlling the slip in the transmission of FIG. 1.

DESCRIPTION OF THE PREFERRED EMBODIMENTS

FIG. 1 shows an embodiment of a continuously variable transmission 1 of a type comprising a primary pulley 2—generally the drive side pulley—and a secondary pulley 3—generally the driven side pulley. The primary pulley 2 has a drive shaft 4 coupled to an engine 5, and the secondary pulley 3 has a driven shaft 6 coupled to a load process, in this case wheels 7 of a schematised vehicle 8. The continuously variable transmission 1 as shown in the drawing is only one example of possible types of continuously variable transmissions mentioned in the preamble of the description above, which could be applied here. The pulleys 2 and 3 are each provided with discs 9, 10 and 11, 12 respectively. Generally two of the discs 10 and 11 are displaceable along their respective shafts 4 and 6. Displacement takes place by clamping force means 13-1 and 13-2 in order to influence the radius of an endless transmission means/element or belt 14 travelling between the pairs of discs 9, 10 and 11, 12 respectively. Generally the elements 2, 3, 9, 10, 11, 12 and 14 are designated as a variator. The endless transmission means 14 transmits a driving torque from the engine 5 to the wheels 7 or vice versa. The clamping force means 13-1, 13-2 are each coupled with a control means 15 for influencing the driving torque through the transmission 1 by controlling the clamping force applied on the endless transmission means 14. A throttle valve in the engine 5 provides a fuel valve opening signal V for the control means 15. The transmission 1 as a whole is, apart from a schematically shown brake B provided with a clutch 16, where through generally the driving torque passes and which is also coupled with the control means 15. The clutch 16 is shown to be mounted between the transmission 1 and the wheels 7, but could also be mounted between the engine and the transmission 1.

During torque transmitting or driving conditions, wherein a constant or fluctuating torque is conveyed from the engine 5 through the transmission 1 to the wheels 7, the clutch 16 is controlled by the control means 15 so that it is allowed to slip. During those conditions, wherein the clutch 16 may slip continuously, the control means 15 may reduce the clamping force which the clamping force means 13-1 and/or 13-2 apply through the discs 9-12 on the transmission element 14.

The control means 15 is provided with calculating means, generally in the form of a microprocessor PROC whereto signals are input which represent various shaft speeds measured by respective speed sensors S. In this respect U.S. Pat. No. 4,606,446 included here by reference thereto describes various signals, calculations, algorithms and embodiments of in particular the electronics, which could at least partly be used in the control means 15. Such speed sensors S are inter alia coupled with the drive shaft 4, the driven shaft 6 which forms the in-going clutch-shaft, and an out-going clutch-shaft 17. The clutch 16 is provided with a slip control input 18 carrying a slip control signal, so that the absolute or relative amount of allowed slip, that is the rotation speed difference between the clutch-shafts 6 and 17, can be calculated and controlled.

Said clutch 16 may be a plate-type clutch, wherein torque is transmitted from the in-going shaft 6 to the out-going shaft 17 by means of friction. The clutch slip of a plate-type clutch is defined as the difference between the rotational speed of the in-going shaft 6 and that of the out-going shaft 17. A clutch pressure is applied to parts of the clutch to determine the amount of friction and thereby the amount of clutch slip that occurs when a given amount of torque is transmitted through said clutch. Usually said clutch pressure is hydraulically applied by means of a clutch control system comprising an electrically controlled valve. The slip control of the clutch 16 may be achieved according to the following steps:

determining the rotational speed of the in-going shaft 6 and of the out-going shaft 17 of the clutch 16 by means of the speed sensors S;

determining the difference between said speeds by means of the microprocessor PROC/CALC;

increasing the clutch pressure if said difference is larger than the allowed amount of continuous slip or decreasing the clutch pressure if said difference is smaller than the allowed amount of continuous slip. Said clutch pressure may for instance be adjusted through microprocessor PROC/CALC by sending an appropriate control signal to said electronically controlled valve of the clutch control system.

At wish, but not necessarily, simultaneous with control of the slip by the control means 15 these means control the clamping force by outputting one or more clamping force control signals P1, P2 on respective control inputs 19, 20 provided on the clamping force means 13-1, 13-2 respectively. The clamping force is generally reduced during those clutch slip conditions. The clutch 16 may at wish be combined to a clutch unit, which includes a neutral/reverse/forward driving unit with or without a planetary gear set, such as described in EP-A-0 446 497, which is included here by reference thereto.

The allowed slip is mostly smaller than 1 or 2 promille counted from the maximum rotation speed of the engine drive shaft 4. Such a slip assures fuel savings and a limited and well defined transmission of torque to the variator, whose clamping force (in particular its line pressure) can be decreased. Preferably the slip lies in the relevant, good measurable clutch shafts speed difference range between 0 and approximately 20 rpm, preferably between 0 and 10 rpm, more preferably around 5 rpm. FIG. 2 shows the net positive fuel savings due to reduced clamping force. The graph shows in particular that within the above specified slip range an increase of the slip Sl only reveals a very small reduction of these savings, whereas the allowance further slip in the clutch 16 provides possibilities for a further reduced reduction of the clamping force. A higher slip decreases the fuel savings, which is globally shown in FIG. 2. A slip Sl which approaches the upper limit mentioned above will eventually cause heat problems and will shorten the life time of the clutch 16. If necessary the heat can be removed from the clutch. By however measuring and/or calculating the possibly abundant heat provided by the slipping clutch material an auxiliary signal T arises for effective control of the slipping process in dependence on the various conditions and torques applied by the engine, but also applied by the kind of road whereon the vehicle drives and in particular the kind of bricks in certain pavements. An effective control of the slip will provide noise and vibration reduction control merits. Stability of the slip control process, apart from the slip strategy applied is also important in practise. In this respect it has appeared also that some properties of the clutch friction material such as its friction coefficient in dependence on the actual slip may lead to an improved controllability of the slipping process. The stability of the slipping process improved noticeable in case of choice of a clutch friction material which has the feature that its friction coefficient increases with increasing slip. Such a behaviour of the friction coefficient $\mu$ as a function of the slip Sl is shown in FIG. 3. In particular an improved stability can be reached in a slip and friction coefficient region, where a positive first derivative of the friction coefficient $\mu$ versus the slip Sl arises. Right of a point R in FIG. 3 the friction coefficient is practically reflected by a straight line, which is virtually a constant as a function of the slip Sl, so that it is ensured that even during road induced disturbances a constant torque is transmitted through the 25 clutch 16. Preferably the amount of the allowed adjusted slip of the clutch 16 on average amounts about half of the slip Sr at the point R in the friction coefficient $\mu$ versus slip Sl curve.

FIG. 4 exemplifies one of the various possible slip strategies in a state diagram, which can be software implemented in the control means 15, and in particular in its processor. Entering a zero slip condition or state ZS the slip can gradually be increased to enter the stationary condition SC, wherein the slip is being controlled as outlined heretofore. From there the slip can be reduced to return to state ZS. For safety reasons from each of these states a transition is possible to a full safe state FS, wherein all signals and variables of the torque and slip process have a controllable, known, fixed and/or safe value. From state SC a transition to and from a state PS is possible, wherein an pressure and clamping force applied in the transmission 1 is being limited between upper and lower boundaries, of course several variations and modifications are possible when reducing the presently explained concept, process and strategy to a practical form of realisation, when it comes to the continuously variable transmission applied in a load process or in certain types of vehicles.

What is claimed is:

1. A continuously variable transmission (CVT) connecting a driving shaft adapted to be coupled to an engine and a driven shaft adapted to be coupled to a load, the CVT comprising:

transmission means for transmitting power between the driving and driven shafts;

clamping force application means for applying a clamping force to said transmission means;

a clutch having an in-going shaft and an outgoing shaft; and control means for controlling both said clamping force application means and said clutch to cause said clutch to slip a non-zero amount during continuous operation of the CVT, an amount of the clutch slip being a difference between a rotational speed of said in-going shaft and a rotational speed of said out-going shaft, and to reduce the clamping force when said clutch slips the non-zero amount compared to when said clutch has zero slip.

2. The CVT of claim 1, wherein the non-zero amount of clutch slip is substantially constant during continuous operation of the CVT.

3. The CVT of claim 1, wherein the non-zero amount of clutch slip is up to 20 rpm.

4. The CVT of claim 3, wherein the non-zero amount of clutch slip is up to 10 rpm.

5. The CVT of claim 4, wherein the non-zero amount of clutch slip is about 5 rpm.

6. The CVT of claim 1, wherein said clutch is associated with the driven shaft.

7. The CVT of claim 6, wherein said clutch slips the non-zero amount throughout substantially all of a rotational speed range of the driven shaft.

8. The CVT of claim 1, wherein said control means determines an amount of the clutch slip and controls said clutch based on the determined amount.

9. The CVT of claim 1, wherein said clutch comprises a clutch plate having a contact surface whose friction coefficient increases with an increasing amount of the clutch slip in a first range of the amount of clutch slip and whose friction coefficient is substantially constant at a second range of the amount of clutch slip that is higher than the first range.

10. A continuously variable transmission (CVT) connecting a driving shaft adapted to be coupled to an engine and a driven shaft adapted to be coupled to a load, the CVT comprising:

transmission means for transmitting power between the driving and driven shafts;

clamping force application means for applying a clamping force to said transmission means, the clamping force being a force required to transmit the power plus a safety margin;

a clutch having an in-going shaft and an outgoing shaft; and control means for controlling said clamping force application means and for controlling said clutch to select a zero slip condition wherein said clutch does not slip and a clutch slip condition wherein said clutch allows a non-zero amount of clutch slip, an amount of the clutch slip being a difference between a rotational speed of said in-going shaft and a rotational speed of said out-going shaft, wherein the safety margin in the clutch slip condition is lower than the safety margin in the zero slip condition.

11. The CVT of claim 10, wherein the non-zero amount of clutch slip is substantially constant during continuous operation of the CVT.

12. The CVT of claim 10, wherein the non-zero amount of clutch slip is up to 20 rpm.

13. The CVT of claim 12, wherein the non-zero amount of clutch slip is up to 10 rpm.

14. The CVT of claim 13, wherein the non-zero amount of clutch slip is about 5 rpm.

15. The CVT of claim 10, wherein said clutch is associated with the driven shaft.

16. The CVT of claim 15, wherein said clutch slips the non-zero amount throughout substantially all of a rotational speed range of the driven shaft.

17. The CVT of claim 10, wherein said control means determines an amount of the clutch slip and controls said clutch based on the determined amount.

18. The CVT of claim 10, wherein said clutch comprises a clutch plate having a contact surface whose friction coefficient increases with an increasing amount of the clutch slip in a first range of the amount of clutch slip and whose friction coefficient is substantially constant at a second range of the amount of clutch slip that is higher than the first range.

\* \* \* \* \*